(12) United States Patent
Rabinovich (10) Patent No.: US 9,021,082 B2
(45) Date of Patent: Apr. 28, 2015

(54) INTERNET MEASUREMENT SYSTEM APPLICATION PROGRAMMING INTERFACE

(75) Inventor: Michael Rabinovich, Solon, OH (US)

(73) Assignee: Case Western Reserve University, Cleveland, OH (US)

( * ) Notice: Subject to any disclaimer, the term of this patent is extended or adjusted under 35 U.S.C. 154(b) by 1204 days.

(21) Appl. No.: 12/322,315

(22) Filed: Jan. 30, 2009

(65) Prior Publication Data

US 2009/0265421 A1    Oct. 22, 2009

Related U.S. Application Data

(60) Provisional application No. 61/062,911, filed on Jan. 30, 2008.

(51) Int. Cl.
| | | |
|---|---|---|
| G06F 15/173 | (2006.01) | |
| H04L 12/26 | (2006.01) | |
| H04L 12/28 | (2006.01) | |
| H04L 12/14 | (2006.01) | |
| H04L 12/24 | (2006.01) | |
| H04L 29/08 | (2006.01) | |

(52) U.S. Cl.
CPC ......... *H04L 12/2602* (2013.01); *H04L 12/2621* (2013.01); *H04L 12/2678* (2013.01); *H04L 12/2618* (2013.01); *H04L 12/2634* (2013.01); *H04L 12/2856* (2013.01); *H04L 12/14* (2013.01); *H04L 41/22* (2013.01); *H04L 43/00* (2013.01); *H04L 43/12* (2013.01); *H04L 67/104* (2013.01)

(58) Field of Classification Search
CPC ............ H04L 12/2634; H04L 12/2618; H04L 12/2621; H04L 12/2678; H04L 12/2856
See application file for complete search history.

(56) References Cited

U.S. PATENT DOCUMENTS

| | | | | |
|---|---|---|---|---|
| 4,982,185 A * | 1/1991 | Holmberg et al. | ........... | 340/4.21 |
| 6,449,739 B1 * | 9/2002 | Landan | ........... | 714/47 |
| 6,980,091 B2 * | 12/2005 | White et al. | ........... | 340/5.53 |
| 7,209,898 B2 * | 4/2007 | Pfeiffer et al. | ........... | 705/51 |
| 7,656,810 B2 * | 2/2010 | Horton et al. | ........... | 370/242 |
| 7,987,258 B2 * | 7/2011 | Sugauchi et al. | ........... | 709/224 |
| 8,073,943 B2 * | 12/2011 | Monk et al. | ........... | 709/224 |
| 2002/0116491 A1 * | 8/2002 | Boyd et al. | ........... | 709/224 |
| 2003/0023710 A1 * | 1/2003 | Corlett et al. | ........... | 709/223 |
| 2005/0044213 A1 * | 2/2005 | Kobayashi et al. | ........... | 709/224 |

OTHER PUBLICATIONS

Ji, Chuanyi, "Measurement-Based Network Monitoring and Inference: Scalability and Missing Information," May 4, 2002, IEEE, vol. 20, No. 4. pp. 714-725.*

* cited by examiner

*Primary Examiner* — Azizul Choudhury
(74) *Attorney, Agent, or Firm* — Kraguljac Law Group, LLC.

(57) ABSTRACT

Systems, application programming interfaces, and other embodiments associated with internet measurements are described. Example systems and methods facilitate requesting that a control server acquire internet measurements from a set of distributed measurement points. One example application programming interface (API) includes a list request interface to provide a list request to a control server. The list request may request a list of measurement points from the control server. The example API may also include a list receipt interface to receive a list response from the control server. The list response may contain information concerning measurement points. The API may enable a user to perform a complex series of internet measurements by giving the user access to standardized function calls for accessing a distributed internet measurement system.

23 Claims, 7 Drawing Sheets

INTERNET MEASUREMENT SYSTEM APPLICATION PROGRAMMING INTERFACE

CROSS REFERENCE TO RELATED APPLICATIONS

This application claims the benefit of provisional application No. 61/062,911 filed Jan. 30, 2008.

FEDERAL FUNDING NOTICE

The invention was developed with federal funding supplied under Federal Grant No. CNS-0520105 and CNS-0721890 provided by the National Science Foundation. The Federal government has certain rights in the invention.

BACKGROUND

Systems and methods may exist for running focused, on-demand internet measurements. Some conventional approaches for acquiring internet measurements may require using systems with limited data collection points. This may lead to inaccurate measurements due to the small number of collection points. Additional inaccuracies may arise from internet service providers influencing measurements by, for example, giving priority to packets to and from the collection points, and/or by building service nodes closer to the collection points.

Some conventional systems may address these issues by allowing a widely distributed array of users to download a measurement point software. This may increase the number of data collection points available and may make it more difficult for internet service providers to influence measurements. Additionally, some approaches leave it to a researcher to discover measurement systems, arrange access to them, and communicate with them to obtain measurements. Still other systems may simply provide a graphical user interface (GUI) to select measurement hosts and the measurements to be performed. Thus, systems that provide GUIs may require an experimenter to manually set up simple monitoring tasks with periodic measurements from specified hosts. This may require the experimenter to monitor the measurements and to manually make changes. This non-automatic oversight may be expensive and/or ineffective as labor is costly and humans may not be able to react quickly when changes are necessary.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

One example distributed internet measurement platform, the Deep Internet Performance Zoom (DipZoom) platform, includes measuring points (MPts), clients, and the DipZoom core. MPts advertise their capabilities to the core (e.g., platform, offered measurements, etc.), announce their coming on-line, and perform measurements requested by the core on behalf of measurement requesters. The core maintains the database of the MPts and keeps track of MPts that are currently on-line. A measurement requestor may query the database for a list MPts that fit requirements based on characteristics including geographic location, identification number, operating system, connection bandwidth, and so forth. The measurement requestor may then submit measurement requests for selected MPts to the core, and download the results when the measurements have completed. Thus the DipZoom platform is, in one example, a peer-to-peer system for internet measurements. The core serves as both the central index of peers and the focal point for communication between clients and MPts.

In the DipZoom platform, a user may download and install DipZoom measuring software to become a measuring point (MPt). The core may generate MPt executable instances dynamically when the measuring software is downloaded. This may allow the core to assign a globally unique ID (MPtID) to instances of the measuring software and to embed a unique secret key into instances of the measuring software. Subsequent interactions between a MPt and the core may be encrypted using the MPt's secret key. A result of this encryption may be that MPts may be difficult to access. Therefore an application programming interface (API) may bridge communications between requesters and the DipZoom core. However, a person having ordinary skill in the art can see how there may be other advantages and reasons to use an API. In the DipZoom platform, the API is embedded in software that may be packaged with the measurement software. The API may facilitate scripting together a series of internet measurements.

Requests sent through the API are handled by the DipZoom core. The core handles requests for information regarding measurement points. The core also handles requests regarding internet measurements. When a measurement requester requests an internet measurement through the API, the measurement requestor may specify MPts and measurements to be performed by the MPts. The core formulates the requests and passes them along to the MPts to perform the measurements. When an MPt has completed the specified measurement, the MPt supplies the requested information back to the core. The information is then stored in the core. A measurement requester may then retrieve information regarding completed measurements through the API.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Figure 1:
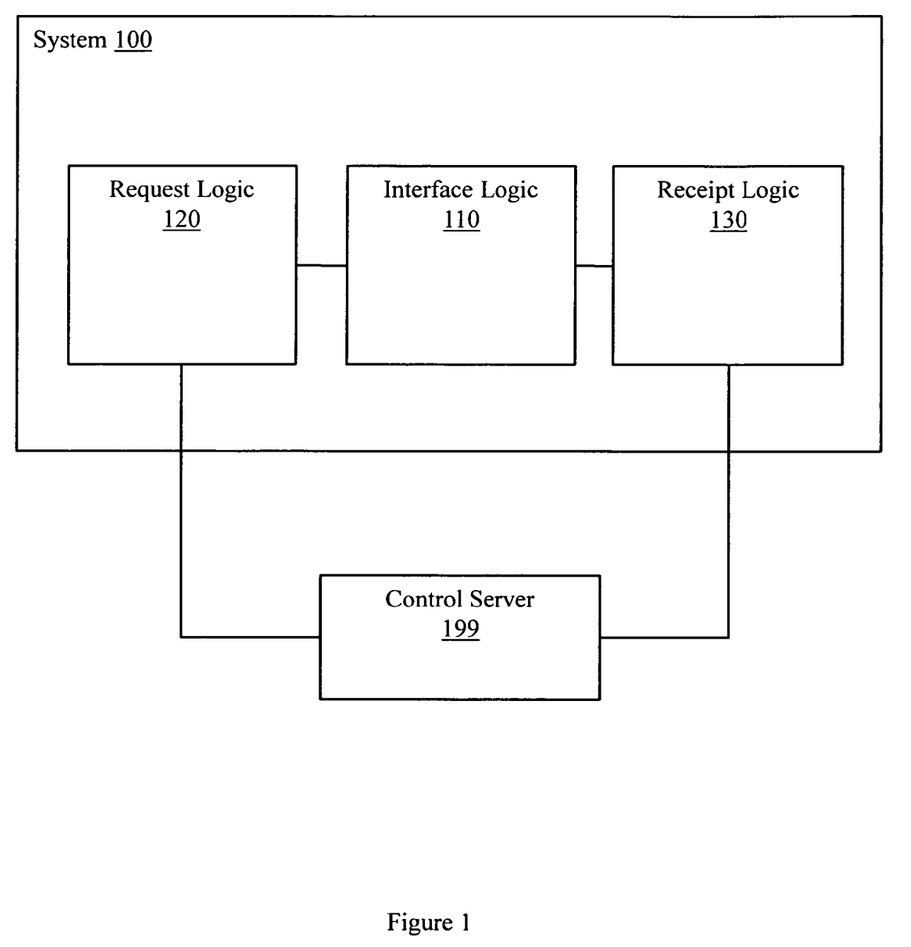
FIG. 1 illustrates an example system associated with internet measurements.

FIG. 1 illustrates an example system 100 associated with internet measurements. System 100 interacts with a control server 199 to acquire internet measurement data from a distributed network of systems. System 100 includes an interface logic 110. Interface logic 110 may generate an action request based on a set of inputs. The set of inputs may identify a distributed internet measurement client (DIMC). The set of inputs may also identify an action associated with the DIMC. While generating the action request is described as being based on the set of inputs, a person having ordinary skill in the art can see how other factors may influence how interface logic 110 generates the action request. System 100 also includes a request logic 120. Request logic 120 may provide the action request to control server 199. Control server 199 may control a set of DIMCs. Request logic 120 may provide the action request by causing the action request to be transmitted over a network to control server 199. System 100 also includes a receipt logic 130. Receipt logic 130 may receive a response from control server 199. The response may be provided in response to the action request. In one example, interface logic 110 may formulate the response from the control server 199 into a set of data. Interface logic 110 may then provide the set of data. Providing the set of data may include, storing the data to a computer-readable medium, displaying the data for a user via a graphical user interface, transmitting the data to an external logic for further manipulation, and so forth.

A DIMC may be associated with a set of client unique properties and a set of client generic properties. A client unique property may be a property held by one DIMC (e.g., client identification number, IP address, MAC address, and so forth). A client generic property may be a property held by one or more DIMCs (e.g., geographic location, client type, group identification number, configuration value, internet service provider, bandwidth value, owner, operating system, and so forth). In one example, the set of inputs may identify the DIMC with a client generic property. In this example, the action associated with the DIMC identified by the set of inputs may be requesting a list of identifiers of DIMCs having the client generic property. Thus, an example action query may request identifiers of DIMCs that are in a specific building that are owned by a specific company.

In another example, the set of inputs may identify the DIMC with a client unique property. In this example, one possible action associated with the DIMC identified by the set of inputs may be requesting a measurement be performed by the DIMC. Thus, by identifying a client identification number(s) of a DIMC(s), interface logic 110 may generate an action signal that causes control server 199 to queue up a measurement(s) for the DIMC(s). While a queue is described in this example, a person having ordinary skill in the art can see how other ways to store data may be applicable. In response to receiving a measurement request in an action query, control server 199 may provide a ticket identification number(s) associated with the measurement request. In one example, a ticket identification number may be associated with a single measurement being performed by a single DIMC. However, a person having ordinary skill in the art can see how a ticket identification number could be associated with multiple measurements being performed by a DIMC(s). Thus, a ticket identification number may be either a client unique property or a client generic property depending on the implementation of the control server and the client software.

Another possible action associated with the DIMC identified by the set of inputs may be requesting a status of a measurement being performed by the DIMC. An action query for requesting a measurement status may use a ticket identification number to identify the measurement(s) in question. Upon receiving an action query requesting a measurement status, control server 199 may provide a response comprising a binary indication as to whether the measurement has been completed. However, a person having ordinary skill in the art can see how there may be other possible pieces of information included in responses including estimated time to completion, actual measurement data, and so forth.

Another possible action associated with the DIMC identified by the set of inputs may be requesting a result of a measurement being performed by the DIMC. As described above, a ticket identification number may identify the measurements. Upon receiving an action query requesting a result, control server 199 may provide a set of data it has received from a DIMC associated with the ticket identified by the ticket identification number. As before, a person having ordinary skill in the art can see how other responses may be appropriate in other implementations. Thus, control server 199 may allow system 100 to acquire information about and from DIMCs. While four example actions are described, a person having ordinary skill in the art can see how system 100 may facilitate additional actions (e.g., paying the control server and/or a DIMC for a measurement).

By way of illustration, a company concerned with streaming video and audio may be interested in estimating an appropriate level of quality of media to serve to customers based on their geographic location. A researcher at the company may query a control server for a list of DIMCs that are willing to perform measurements involving large data files. Additionally, the researcher may request that the list include the geographic location of DIMCs. The control server may then respond to the request with a list of client IDs that are willing to perform measurements involving large data files and are willing to disclose their geographic location. The researcher may then select some or all of the DIMCs to perform a test. In one example, the researcher may request that the DIMCs see how long it takes to download a movie (e.g., Road House starring Patrick Swayze). In another example, the researcher may request that the DIMCs determine how much time they spend buffering a song (e.g., Livin' on a Prayer by Bon Jovi). The control server may process this request and control the DIMCs to perform the selected measurement. As measurements involving larger files (e.g., high quality audio and/or video files) may take some time, the researcher may configure his system to check for results every few hours. As results come in, the researcher's system may ask the control server to tell the system which measurements have completed and then download data from the completed measurements. This may allow the researcher to program the researcher's system to dynamically add measurement data to a set of results that the researcher may use to estimate quality settings for various locations.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Figure 2:
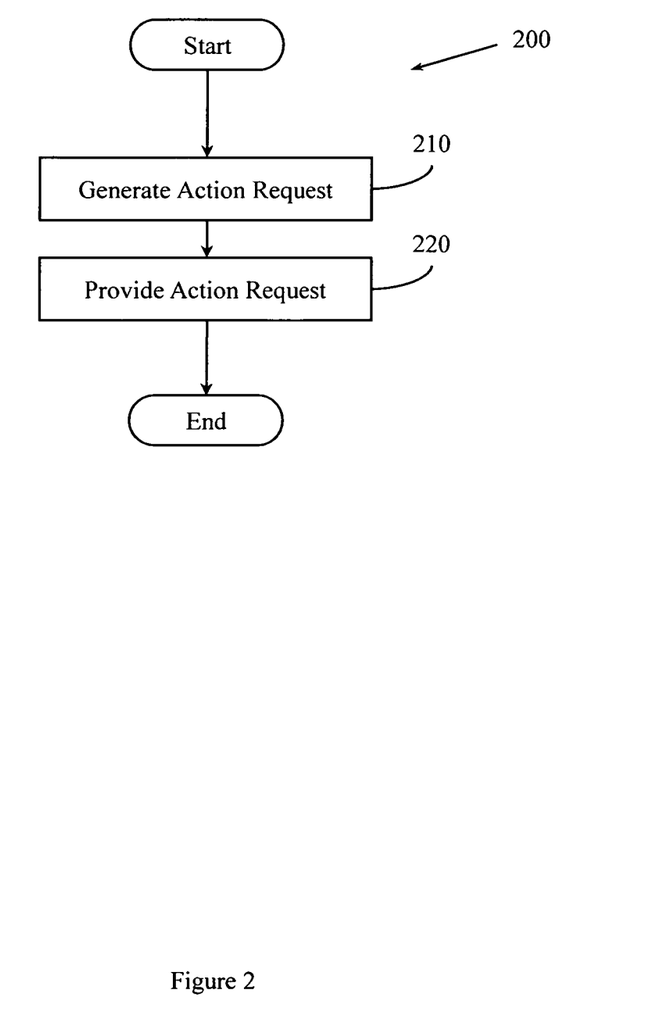
FIG. 2 illustrates an example method associated with internet measurements.

FIG. 2 illustrates an example method 200 associated with internet measurements. Method 200 includes, at 210, generating an action request. The action request may be based on a distributed internet measurement client (DIMC) identifier. The action request may also be based on an action identifier that identifies an action associated with the DIMC. As described above there may be several different types of DIMC identifiers and actions that can be performed relating to DIMCs. Method 200 also includes, at 220, providing the action request to a control server. The control server may control a set of DIMCs. Continuing with the above example, method 200 illustrates a process that may be performed by a researcher's system after the researcher has programmed the system to request a series of measurements.

While FIG. 2 illustrates various actions occurring in serial, it is to be appreciated that various actions illustrated in FIG. 2 could occur substantially in parallel. By way of illustration, a first process could generate an action request, and a second process could provide the action request. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 200. While executable instructions associated with the above method are described as being stored on a computer-readable medium, it is to be appreciated that executable instructions associated with other example methods described herein may also be stored on a computer-readable medium.

Figure 3:
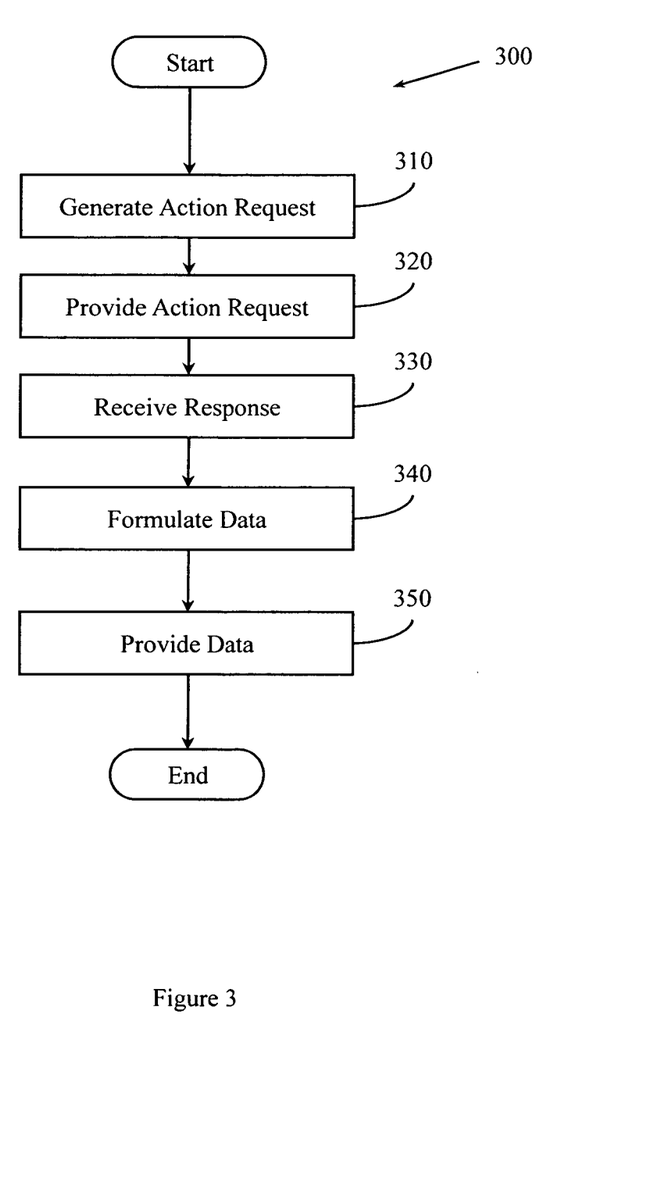
FIG. 3 illustrates another example method associated with internet measurements.

FIG. 3 illustrates a method 300 associated with internet measurements. Method 300 includes several actions similar to method 200 (FIG. 2). For example, method 300 includes generating an action request at 310, and providing the action request at 320. However, method 300 includes additional actions. Method 300 also includes, at 330, receiving a response from the control server. The response may be provided in response to the action request. Method 300 also includes, at 340, formulating a set of data based on the response. Method 300 also includes, at 350, providing the set of data. As described above there may be several different ways the data may be provided. Thus, method 300 illustrates a process that, like method 200 (FIG. 2), may allow a researcher to interact with a control server. However, method 300 also illustrates how the researcher's system may receive and interpret data from the control server and provide that data to the researcher.

Figure 4:
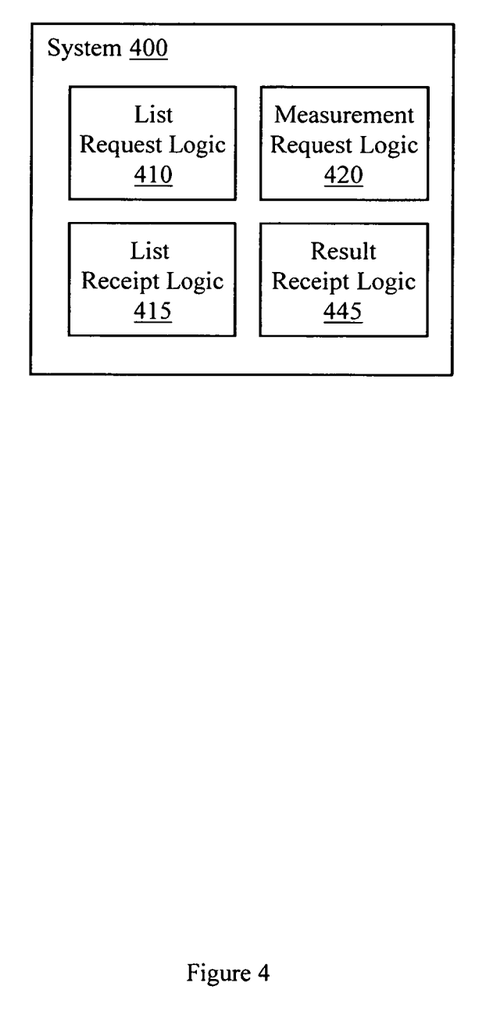
FIG. 4 illustrates another example system associated with internet measurements.

FIG. 4 illustrates a system 400 associated with performing internet measurements. System 400 includes a list request logic 410. List request logic 410 may provide a list request to a control server. The list request may be generated based, at least in part, on a set of inputs from a requesting entity (e.g., a user, a logic, and so forth). The list request may request a list of measurement points from the control server. The list of measurement points requested from the control server may be based on a set of characteristics identified by the list request. The set of characteristics may identify a geographic location, an identification number, a client type, a configuration value, a bandwidth value, an internet service provider, an owner, and so forth. System 400 also includes a list receipt logic 415. List receipt logic 415 may receive a list response from the control server. The list response may contain a set of information concerning a measurement point.

System 400 also includes a measurement request logic 420. Measurement request logic 420 may provide a measurement request to the control server. The measurement request may request that an internet measurement be performed by a measurement point. A measurement request may identify a measurement source and a measurement target. Both measurement sources and measurement targets may be measurement points. However, one example measurement may determine how long it takes a measurement source to download a file stored on a measurement target that may not be otherwise configured with measurement point functionality. A person having ordinary skill in the art can see how other measurements may be useful (e.g., ping, trace route, and so forth). System 400 also includes a result receipt logic 445. Result receipt logic 445 may receive a result response from the control server. The result response may contain a result of an internet measurement.

In one example, the control server may impose a limit on the aggregate measurement rate against a given measurement target. This may help prevent the measurement target from being overwhelmed with measurement requests and/or preventing the measurement target from having other functionalities impacted. The control server may also impose a limit on the measurement rate of a given measurement source. As above, this may reduce the likelihood that a large number of internet measurements may adversely impact a measurement source. The control server may impose these limits as a function of the bandwidth consumed by the measurements, the number of measurements per time unit, and so forth. In one example, a measurement point may establish a local measurement rate limit for measurements it performs. The measurement rate limit may influence limits imposed by the control server associated with the measurement point. As described above, the measurement rate limit may be a function of bandwidth consumed by measurements, the number of measurements per time unit, and so forth.

Figure 5:
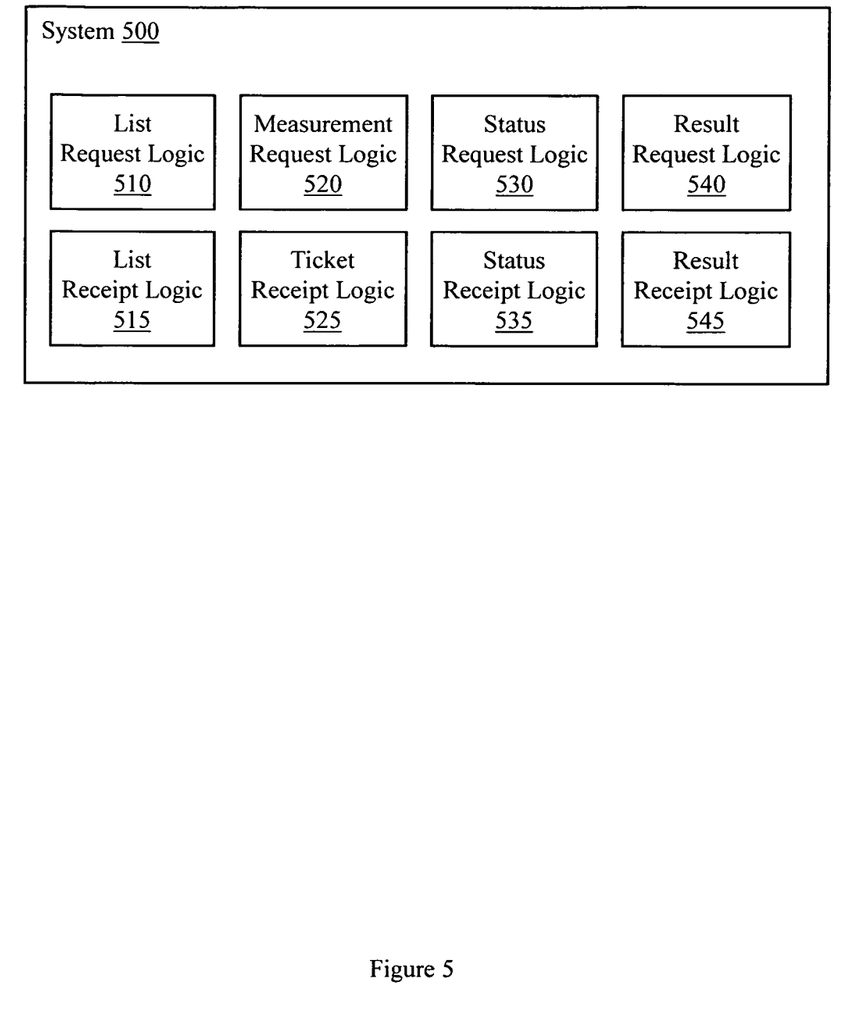
FIG. 5 illustrates another example system associated with internet measurements.

FIG. 5 illustrates a system 500 associated with internet measurements. System 500 includes some elements similar to system 400 (see FIG. 4). For example, system 500 includes a list request logic 510, a list receipt logic 515, a measurement request logic 520, and a result receipt logic 545. However, system 500 includes additional elements. System 500 includes a ticket receipt logic 525. Ticket receipt logic 525 may receive a ticket response from the control server. The ticket response may contain a ticket identification number that corresponds to an internet measurement. System 500 also includes a status request logic 530. Status request logic 530 may provide a status request to the control server. The status request may request a status of an internet measurement. System 500 also includes a status receipt logic 535. Status receipt logic 535 may receive a status response from the control server. The status response may contain a status of an internet measurement. System 500 also includes a result request logic 540. Result request logic 540 may provide a result request to the control server. The result request may request a result of an internet measurement. Thus, system 500 illustrates logics that may allow the above researcher to request information from a control server as well as logics that may allow the researcher to receive requested information from the control server. These logics may allow the researcher to acquire information regarding bandwidth availability from distributed internet measurement clients. In one example, these logics may be application programming interfaces, as described below.

Figure 6:
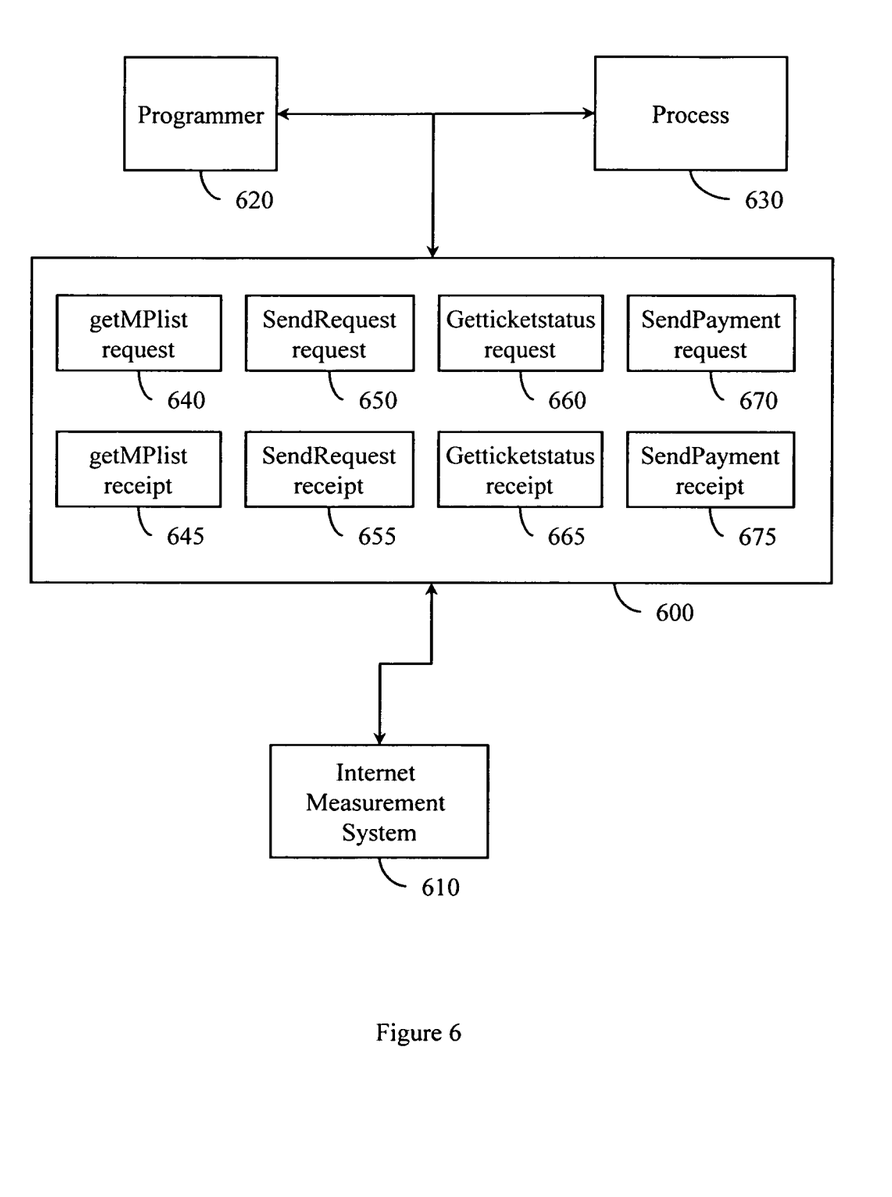
FIG. 6 illustrates an example application programming interface (API) associated with performing internet measurements.

FIG. 6 illustrates an application programming interface (API) 600. API 600 provides access to a system 610 for performing internet measurements. The API 600 can be employed, for example, by a programmer 620 and/or a process 630 to gain access to processing performed by the system 610. For example, a programmer 620 can write a program to access the system 610 (e.g., invoke its operation, monitor its operation, control its operation) where writing the program is facilitated by the presence of the API 600. Rather than programmer 620 having to understand the internals of the system 610, the programmer 620 merely has to learn the interface to the system 610. This facilitates encapsulating the functionality of the system 610 while exposing that functionality.

Similarly, the API 600 can be employed to provide data values to the system 610 and/or retrieve data values from the system 610. For example, a process 630 that examines internet measurement data can request internet measurements from the system 610 via the API 600 by, for example, using a call provided in the API 600. Thus, in one example of the API 600, a set of application programming interfaces can be stored on a computer-readable medium. The interfaces 600 can be employed by a programmer, computer component, logic, and so on, to gain access to a system 610 for performing internet measurements. System 610 may be, for example, implemented in the form of a control server. One example control server is used in conjunction with the DipZoom platform for performing internet measurements. In another example, system 610 can be a distributed system (e.g., a peer-to-peer network of measurement points).

The interfaces 600 include a getMPlist request interface 640. GetMPlist request interface 640 may provide a getMPlist request to a control server. The getMPlist request may request a list of measurement points from the control server. The getMPlist request may identify a set of desired characteristics of the measurement points. The interfaces 600 also include a getMPlist receipt interface 645. GetMPlist receipt interface 645 may receive a getMPlist response from the control server. The getMPlist response may contain a set of information concerning a set of measurement points. Information regarding the measurement points may include, a geographic location, an identification number, an operating system, a measurement type, a bandwidth a number of measurements that a given measurement point is willing to perform in a single request, and so forth.

The interfaces 600 also include a SendRequest request interface 650. SendRequest request interface 650 may provide a SendRequest request to the control server. A SendRequest request may request one or more internet measurements from one or more measurement points. The interfaces 600 also include a SendRequest receipt interface 655. SendRequest receipt interface 655 may receive a SendRequest response from the control server. The SendRequest response may include a list of ticket IDs. A ticket ID may correspond to one or more internet measurements.

The interfaces 600 also include a Getticketstatus request interface 660. Getticketstatus request interface 660 may provide a Getticketstatus request to the control server. A Getticketstatus request may request the status of one or more internet measurements. The interfaces 600 also include a Getticketstatus receipt interface 665. Getticketstatus receipt interface 665 may receive a Getticketstatus response from the control server. A Getticketstatus response may include a ticket ID and a status of one or more internet measurements.

The interfaces 600 also include a Sendpayment request interface 670. Sendpayment request interface 670 may provide a Sendpayment request to the control server. A Sendpayment request may include a list of ticket IDs. The interfaces 600 also include a Sendpayment receipt interface 675. Sendpayment receipt interface 675 may receive a Sendpayment response from the control server. A Sendpayment response may include a result of one or more Internet Measurements. The result to be included may be based, at least in part, on a list of ticket IDs from an associated Sendpayment request.

Figure 7:
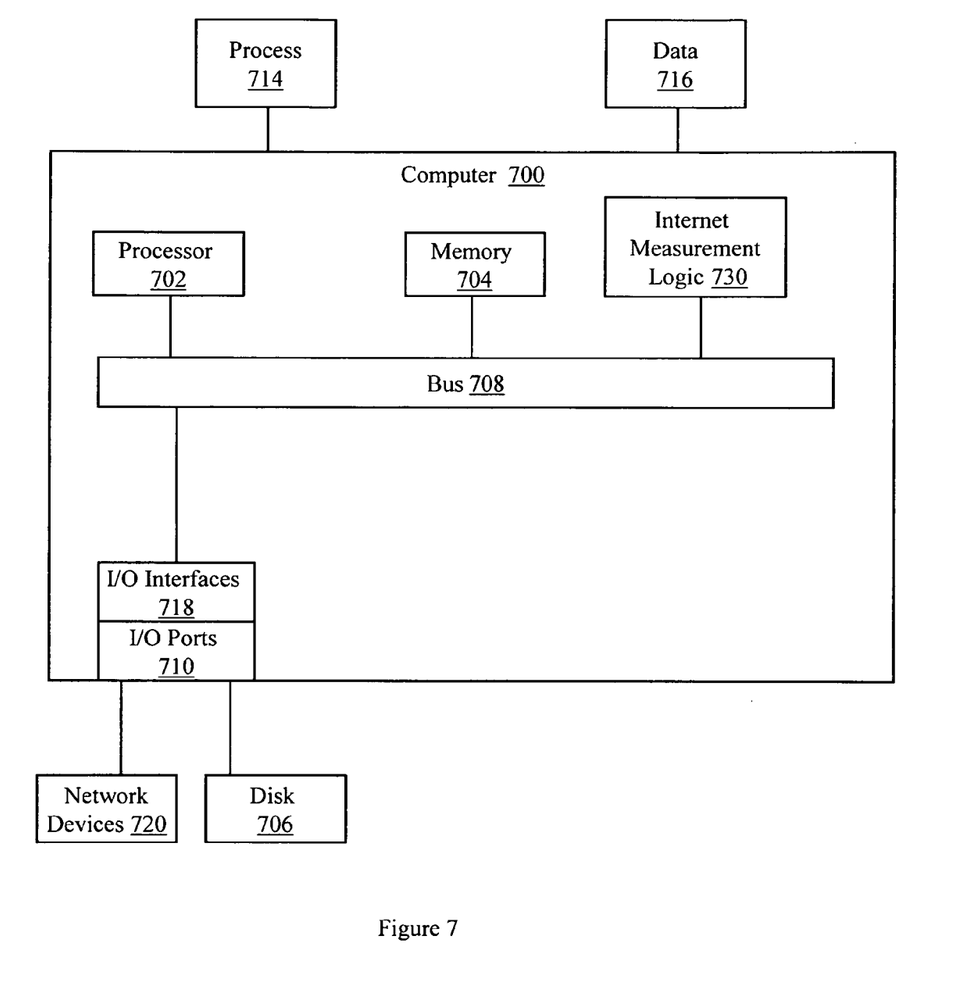
FIG. 7 illustrates an example computing environment in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include an internet measurement logic 730. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

Thus, logic 730 may provide means (e.g., hardware, software, firmware) for requesting an action be taken by a control server. The action may be associated with a distributed internet measurement client. Logic 730 may also provide means (e.g., hardware, software firmware) for receiving a response based on the action from the control server. The means associated with logic 730 may be implemented, for example, as an ASIC. The means may also be implemented as computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM drive, a Blu-Ray drive, an HD-DVD drive, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
    a processor;
    a memory; and
    an interface configured to connect the processor, the memory, and a set of logics, the set of logics comprising:
        an interface logic including at least logic circuitry and configured to
        provide, using a getMPlist request interface, a get measurement point request for a list of measurement points from a control server, and where the get measurement point request identifies a set of characteristics for measurement points of the list of the measurement points,
        receive, using a getMPlist receipt interface, a measurement point list response from the control server that contains a set of information regarding the list of measurement points, wherein the set of information identifies a set of client unique properties of each measurement point and a set of client generic properties of each measurement point, and
        generate an action request based, at least in part, on an internet measurement request from a user, where the action request is formulated from a set of inputs to identify a distributed internet measurement client (DIMC) from the list of measurement points, wherein each DIMC is associated with a set of client unique properties and a set of client generic properties, and where the set of inputs identifies an action associated with performing measurements;
        a request logic including at least logic circuitry and configured to provide, using a SendRequest request interface, the action request to a control server, where the control server is configured to select a set of DIMCs with the set of characteristics based, at least in part, on the action request; and
        a receipt logic including at least logic circuitry and configured to receive, using a Sendpayment receipt interface, a response from the control server that includes a result of measurements performed in response to the action request and to formulate the result into a set of data to be provided to the user, wherein the set of data is based, at least in part, on a list of ticket IDs that identify measurement points and results from measurements performed by the measurement points.

2. The system of claim 1, where the set of client unique properties comprises one or more of, a client identification number, an internet protocol (IP) address, and a media access control (MAC) address.

3. The system of claim 2, where the set of inputs identifies the DIMC with a client unique property.

4. The system of claim 3, where the action is one of, requesting a measurement be performed by the DIMC, requesting a status of a measurement being performed by the DIMC, and requesting a result of a measurement being performed by the DIMC.

5. The system of claim 1, where the set of client generic properties comprises one or more of, an internet service provider, a geographic location, a client type, a group identification number, a configuration value, a bandwidth value, and an owner.

6. The system of claim 5, where the set of inputs identifies the DIMC with a client generic property.

7. The system of claim 6, where the action is requesting a list of identifiers of DIMCs having the client generic property.

8. The system of claim 1, where the interface logic is configured to formulate the response from the control server into a set of data and to provide the set of data.

9. A non-transitory computer-readable medium storing computer-executable instructions that when executed by a computer cause the computer to perform a method, the method comprising:
    providing, using a getMPlist request interface, a get measurement point list request to a control server, where the get measurement point list request requests a list of measurement points from the control server, and where the get measurement point list request identifies a set of desired characteristics of the measurement points;
    receiving, using a getMPlist receipt interface, a get list response from the control server, where the get list response contains a set of information about the list of measurement points that satisfy the set of desired characteristics, where the set of information identifies client unique properties of each measurement point in the list of measurement points and a set of client generic properties of each measurement point in list of measurement points;
    generating an action request to retrieve data associated with an action performed by a distributed internet measurement client (DIMC) from the list of measurement points, where the action request is based, at least in part, on a DIMC identifier, and an action identifier that identifies the action performed by the DIMC, wherein the action performed by the DIMC is an internet measurement;
    providing, using a SendRequest request interface, the action request to a control server, where the control server controls a set of DIMCs that includes the list of measurement points;
    retrieving a result of the action request from the control server;
    formulating the result into a set of data; and
    receiving, using a Sendpayment receipt interface, a payment response from the control server, where the payment response contains the result of the action performed by the DIMC and is based, at least in part, on a list of ticket IDs that identify the DIMC and associated actions performed by the DIMC.

10. The non-transitory computer-readable medium of claim 9, comprising:
    receiving a response from the control server, the response being provided in response to the action request.

11. The non-transitory computer-readable medium of claim 10, comprising:
    formulating a set of data based on the response; and
    providing the set of data.

12. A set of application programming interfaces embodied on a non-transitory computer-readable medium for execution by a computer component in conjunction with performing internet measurements, comprising:

a getMPlist request interface to provide a getMPlist request to a control server, where the getMPlist request requests a list of measurement points from the control server, and where the getMPlist request identifies a set of desired characteristics of the measurement points;

a getMPlist receipt interface to receive a getMPlist response from the control server, where the getMPlist response contains a set of information concerning a set of measurement points, where the set of information identifies a set of client unique properties held by a specific measurement point and a set of client generic properties held by at least one measurement point;

a SendRequest request interface to provide a SendRequest request to the control server, where the SendRequest request requests one or more internet measurements from one or more measurement points, based on the measurement point having specific values for a unique property and a generic property based on the SendRequest request; and a Sendpayment receipt interface to receive a Sendpayment response from the control server, where the Sendpayment response contains a result of one or more internet measurements, based, at least in part, on a list of ticket IDs from an associated Sendpayment request.

13. The set of application programming interfaces of claim 12, comprising:
   a SendRequest receipt interface to receive a SendRequest response from the control server, where the SendRequest response contains a list of ticket IDs, where a ticket ID corresponds to one or more internet measurements;
   a Getticketstatus request interface to provide a Getticketstatus request to the control server, where the Getticketstatus request requests a status of one or more internet measurements;
   a Getticketstatus receipt interface to receive a Getticketstatus response from the control server, where the Getticketstatus response contains a ticket ID and a status for one or more internet measurements; and
   a Sendpayment request interface to provide a Sendpayment request to the control server, where the Sendpayment request contains a list of ticket IDs.

14. A non-transitory computer-readable medium storing computer-executable instructions that when executed by a computer cause the computer to perform a method, the method comprising:
   determining, using a getMPlist request interface and in response to a get measurement point request, a list of measurement points with a set of characteristics specified by the get measurement point request, wherein the set of characteristics identifies a set of unique properties for a measurement point and a set of generic properties of at least one measurement point;
   receiving an internet measurement request to retrieve data from one or more of a plurality of distributed internet measurement client (DIMCs) from the list of measurement points;
   generating an action request formulated from the internet measurement request, wherein the action request includes:
      (i) a measuring point identifier to identify the one or more DIMCs from the list of measurement points that are to perform measurements, and
      (ii) a set of inputs that identify measurement actions for the one or more DIMCs to perform;
   providing, using a SendRequest request interface, the action request to the one or more DIMCs, wherein the action request is a request for a set of internet measurements from the one or more DIMCs that are based, at least in part, on the one or more DIMCs satisfying the set of characteristics for performing the internet measurements; and
   receiving, using a Sendpayment receipt interface, a payment response based, at least in part, on the action request, wherein the payment response includes results of the set of internet measurements that are identified according to a list of ticket identifiers associated with the one or more DIMCs.

15. The non-transitory computer-readable medium of claim 14, where the measuring point identifier includes a key that is used to impede access to the DIMC.

16. The non-transitory computer-readable medium of claim 15, further comprising decrypting the key to grant access to the DIMC.

17. The non-transitory computer-readable medium of claim 14, where the one or more DIMCs are associated with the set of unique properties and the set of generic properties.

18. The non-transitory computer-readable medium of claim 17, where the internet measurement request identifies at least one DIMC from the list of measurement points that has a unique property and a generic property according to the set of characteristics.

19. The non-transitory computer-readable medium of claim 17, where the measurement request is drafted to identify at least two DIMCs having a unique property and a generic property.

20. The non-transitory computer-readable medium of claim 17, where the set of unique properties comprises one or more of, a client identification number, an Internet protocol (IP) address, and a media access control (MAC) address.

21. The non-transitory computer-readable medium of claim 17, where the set of generic properties comprises one or more of, an Internet service provider, a geographic location, a client type, a group identification number, a configuration value, a bandwidth value, and an owner.

22. The non-transitory computer-readable medium of claim 14, where the internet measurement request identifies a DIMC with the measuring point identifier of the DIMC and an action of the measurement actions to be performed by the DIMC, and where the internet measurement request requests a status of the action from the measurement actions to be performed, and a result of the action to be performed.

23. The non-transitory computer-readable medium of claim 14, where the internet measurement request is received from a computer, and where the Internet measurement request is sent from the computer without the intervention of a user.

* * * * *